United States Patent [19]
Eberle

[11] 4,066,825
[45] Jan. 3, 1978

[54] SYSTEM AND METHOD FOR PROTECTING THE ENVIRONMENT IN A BATTERY PRODUCTION ROOM

[75] Inventor: William J. Eberle, Reading, Pa.

[73] Assignee: General Battery Corporation, Reading, Pa.

[21] Appl. No.: 717,362

[22] Filed: Aug. 24, 1976

Related U.S. Application Data

[63] Continuation-in-part of Ser. No. 363,998, May 25, 1973, abandoned.

[51] Int. Cl.² .............................................. H01M 2/12
[52] U.S. Cl. ...................................... 429/71; 204/2.1; 98/115 VM
[58] Field of Search .............. 429/71, 148; 98/115 R, 98/115 LH, 115 VM; 204/2.1

[56] References Cited

U.S. PATENT DOCUMENTS

| 925,708 | 6/1909 | Lake | 429/71 |
|---|---|---|---|
| 1,036,063 | 8/1912 | Bedell et al. | 429/120 |
| 1,198,419 | 9/1916 | Clark | 429/71 |
| 1,285,659 | 3/1916 | Ford | 429/211 |
| 1,313,512 | 8/1919 | Bedell et al. | 429/71 |
| 1,587,147 | 6/1928 | Clark | 429/71 |
| 2,856,448 | 10/1958 | Haubursin | 429/71 |
| 3,818,817 | 6/1974 | Nederman | 98/115 VM |

FOREIGN PATENT DOCUMENTS

| 544,222 | 6/1956 | Italy | 429/71 |
|---|---|---|---|
| 867,426 | 5/1961 | United Kingdom | 429/71 |

Primary Examiner—Donald L. Walton
Attorney, Agent, or Firm—Benasutti Associates, Ltd.

[57] ABSTRACT

A system is provided whereby the vapors that are given off during wet-cell battery formation are drawn directly from the batteries through openings in the cells thereof, into conduits that are readily accessible to an operator, and with the vapors further being drawn into a duct through which they may be delivered for neutralizing, for eventual discharge to atmosphere. A novel nozzle is provided capable of introduction onto the tops of any of the three different standard sized batteries during forming, which nozzles in addition to collecting vapors that are given off during wet-cell battery formation further collect a pre-selected amount of atmospheric gas for combination with said vapors, which selection reduces the explosive potential of the collected fluids during subsequent environmentally acceptable processing.

9 Claims, 9 Drawing Figures

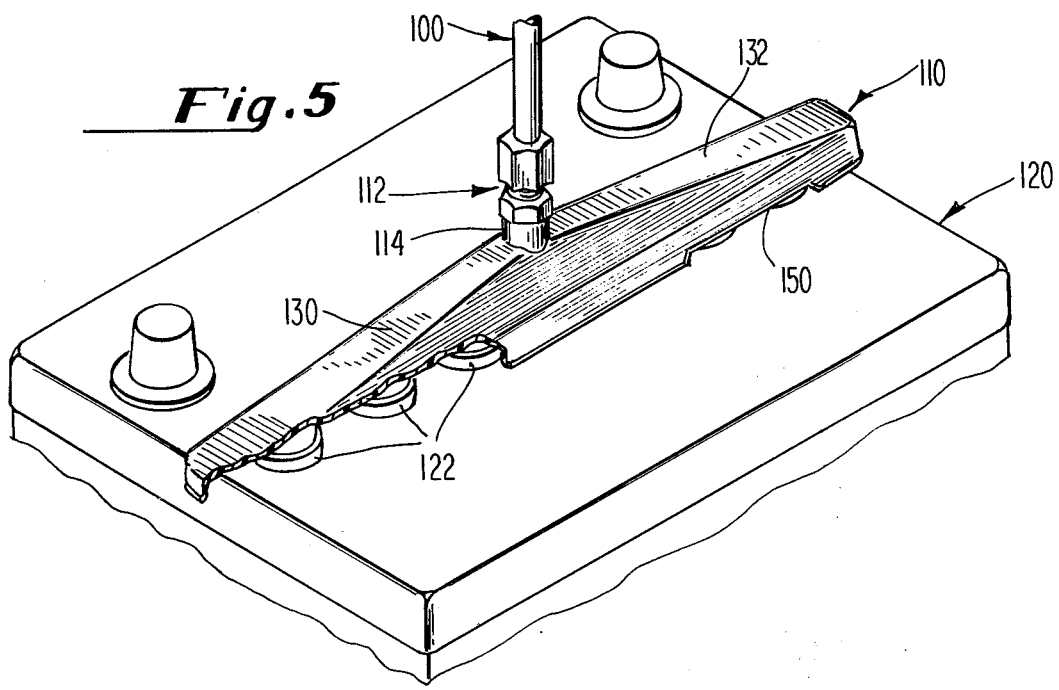
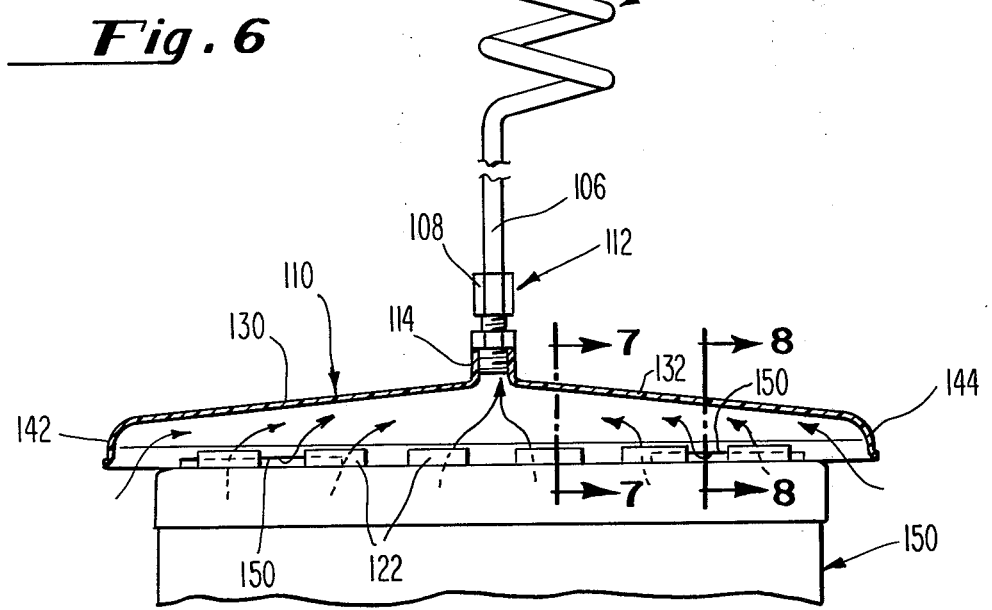

SYSTEM AND METHOD FOR PROTECTING THE ENVIRONMENT IN A BATTERY PRODUCTION ROOM

CROSS-REFERENCE TO RELATED APPLICATIONS

This is a continuation-in-part of my prior co-pending application Ser. No. 363,998, filed May 25, 1973, now abandoned, which application is specifically incorporated by reference as if fully set forth herein.

BACKGROUND OF THE INVENTION

In commercial battery plants, particularly those directly concerned with automotive battery manufacture, it has become rather commonplace to form, i.e., initially charge, large numbers of batteries as part of the battery manufacturing process. Traditionally, the installations or facilities at which batteries are formed are called "forming rooms". Therefore, as used herein the term "forming room" will refer to any commercial battery production facility where batteries having electrolyte therein are being charged in such a way as to convert the paste material on the positive plates to $PbO_2$ and on the negative plates to sponge lead, and wherein such is being done simultaneously to great numbers of batteries, which coincidentially may cause substantial generation of such gases which generally comprise hydrogen, oxygen, and gaseous sulphuric acid.

Thus, as presently practiced, particularly in battery manufacturing installations, batteries are delivered to a forming room on some conveying mechanism, such as a conveyor, either before or after electrolyte has been placed or deposited into the cells thereof. In most instances, the batteries manufactured in greatest numbers are of the automotive lead-acid storage battery type, and although any desired and workable electrolyte solution may be utilized, it has become commonplace to utilize sulfuric acid in solution having a specific gravity within the range of 1.050 to 1.100 for conventional "two shot" formation and 1.190 to 1.265 for conventional "one shot" formation, which gravities may be varied depending on the desired final operating gravity to be obtained. The batteries are then connected to a source of current or a potential to cause electric current to flow between generally alternately spaced plates thereof, whereby the positive plate will come to be a lead peroxide surface, and the other negative plate will develop a sponge lead surface.

Early in the charging of the batteries in this manner, very little gases are given off. However, as the batteries approach a fully charged condition, as is often evidenced by the formation of bubbles at the cell openings, larger amounts of hydrogen and oxygen are given off along with traces of sulfuric acid, and often traces of other corrosive substances. For purposes of the present application, the hydrogen, oxygen and traces of sulfuric acid and any other corrosive substances are referred to herein as "battery vapors".

The hydrogen and oxygen components of the vapors are often substantial in quantity and have the potential for explosion if they accumulate in the battery forming room. Indeed, there has been at least one relatively recent serious instance of a fire and explosion caused by such accumulation of gases in a forming room. A more frequent problem however, is attendant to the presence of corrosive components of the vapors, such as is caused by small droplets that become entrained in the gases given off by the batteries and travel, as components of the hot gases, generally upwardly toward the ceiling of a forming room. Upon cooling slightly, such droplets condense and either drop down onto conveyors causing substantial corrosive action on various components of the conveyors, or else condense on roofs, and actually can destroy roofs as well as other machinery in the environment. These destructive aspects of the corrosive nature of the vapors given off by batteries are not insubstantial, and require periodic replacements of conveyors, roofs, as well as fans and other equipment in the forming room, most particularly at upper levels of elevation in the forming room. For example, because of the heat generated during battery formation as discussed above, and especially because of the heat generated and the usual presence of gases in a forming room, large fans having blades are utilized in order to maintain circulation and reduce the formation of hot spots. Generally, the presence of droplets of corrosive acids and the like is so prevalent in battery forming rooms, particularly at upper elevations near the ceilings thereof, that it has become relatively commonplace that fan blades become corroded and blades can actually fall apart during operation, creating a significant hazard to personnel in the forming room.

Even further, eventually the gases in the forming room must be vented to atmosphere, thereby placing into the atmosphere significant amounts of hydrogen and corrosive gases that can contribute to environmental pollution problems and the like.

Even more important, is the fact that, in a battery forming room, corrosive traces of the vapors condense and are deposited on equipment, personnel and the like, and may remain in the general atmosphere of the forming room for inhalation by workmen who connect the electrical contacts for charging the batteries, constantly monitor the progress of the formation, or place electrolyte in the battery cells, or the like. In any event, such is a possible condition the solution to which the present invention is directed.

SUMMARY OF THE INVENTION

The present invention is directed toward conveying battery vapors as defined above from the battery cells without releasing such vapors into the environment of the forming room, and preferably for neutralizing the gaseous discharge from batteries for eventual discharge into the atmosphere outside a manufacturing plant as a substantially corrosive-free gas.

Accordingly, it is a primary object of this invention to provide a novel method of removing toxic battery vapors from a battery forming room without passing through the environment of the room.

It is a further object of this invention to provide a novel method, as well as the apparatus therefor, of withdrawing battery vapors such as acid droplets, gases such as hydrogen and the like, from within the battery cells, into a duct for discharge from the room environment.

It is a further object of this invention to accomplish either of the above objects, wherein the vapors and the like thus withdrawn are purified, cleaned, or substantially neutralized in such a way as to render them fit for discharge into the environment.

It is a further object of this invention to mix the battery vapors with a pre-selected proportion of atmospheric air at about the point of collection to thereby reduce the possibility of explosion within the system of the present invention.

It is a further object of this invention to accomplish the objects set forth above by providing a novel nozzle configuration adaptable for use with any of a plurality of standard sizes of batteries to be charged.

It is a further object of the present invention to accomplish any of the objects set forth above by mounting each nozzle assembly upon a helical conduit for retaining the nozzle well above the battery conveying surface when not in use, while permitting the nozzle to be attached to the battery to be serviced.

It is still another object of the present invention to provide a novel nozzle configuration which will removably adhere to the top surface of each battery to be serviced when merely placed over the fill holes of said battery.

It is still another object of this invention to accomplish any of the objects set forth above, wherein hydrogen components of the vapors are absorbed, or substantially absorbed prior to discharge of other gaseous components thereof to the atmosphere.

It is another object of this invention to accomplish any of the objects set forth above, wherein acid components of the vapors are substantially neutralized, or withdrawn from those components that are eventually discharged to atmosphere.

It is another object of this invention to provide controls for such cleaning, purification or neutralizing apparatus.

It is a further object of this invention to accomplish all of the above objects, in the environment of a commercial battery production facility.

It is another object of this invention to provide a novel duct having conduit connected thereto, and with each conduit having a multiple cell connection therewith for sealingly or substantially sealingly engaging cell openings and withdrawing vapors from a plurality of cells into a given said conduit.

It is another object of this invention to provide a novel overhead partial vacuum withdrawal system for use in withdrawing battery vapors outside a forming room without passing into the environment of the forming room, and wherein such a system is readily operable by forming room personnel.

Other objects and advantages of the present invention will be readily apparent to those skilled in the art from a reading of the following brief descriptions of the drawing figures, detailed descriptions of the preferred embodiments, and the appended claims.

BRIEF DESCRIPTIONS OF THE DRAWING FIGURES

FIG. 5 is a top perspective view of a relatively small automotive battery showing a partially cut-away nozzle in accordance with the preferred embodiment of the present invention engaging and covering the fill holes of the battery, said nozzle being illustrated only with a portion of its associated conduit.

FIG. 6 is a fore-shortened elevational fragmentary side view showing the helical conduit of the preferred embodiment of the present invention as attached to the preferred nozzle of the present invention, said nozzle being shown in cross-section engaging and covering the fill holes of a relatively small battery, only a portion of which has been illustrated for purposes of clarity.

DESCRIPTION OF THE PREFERRED EMBODIMENTS

Figure 1:
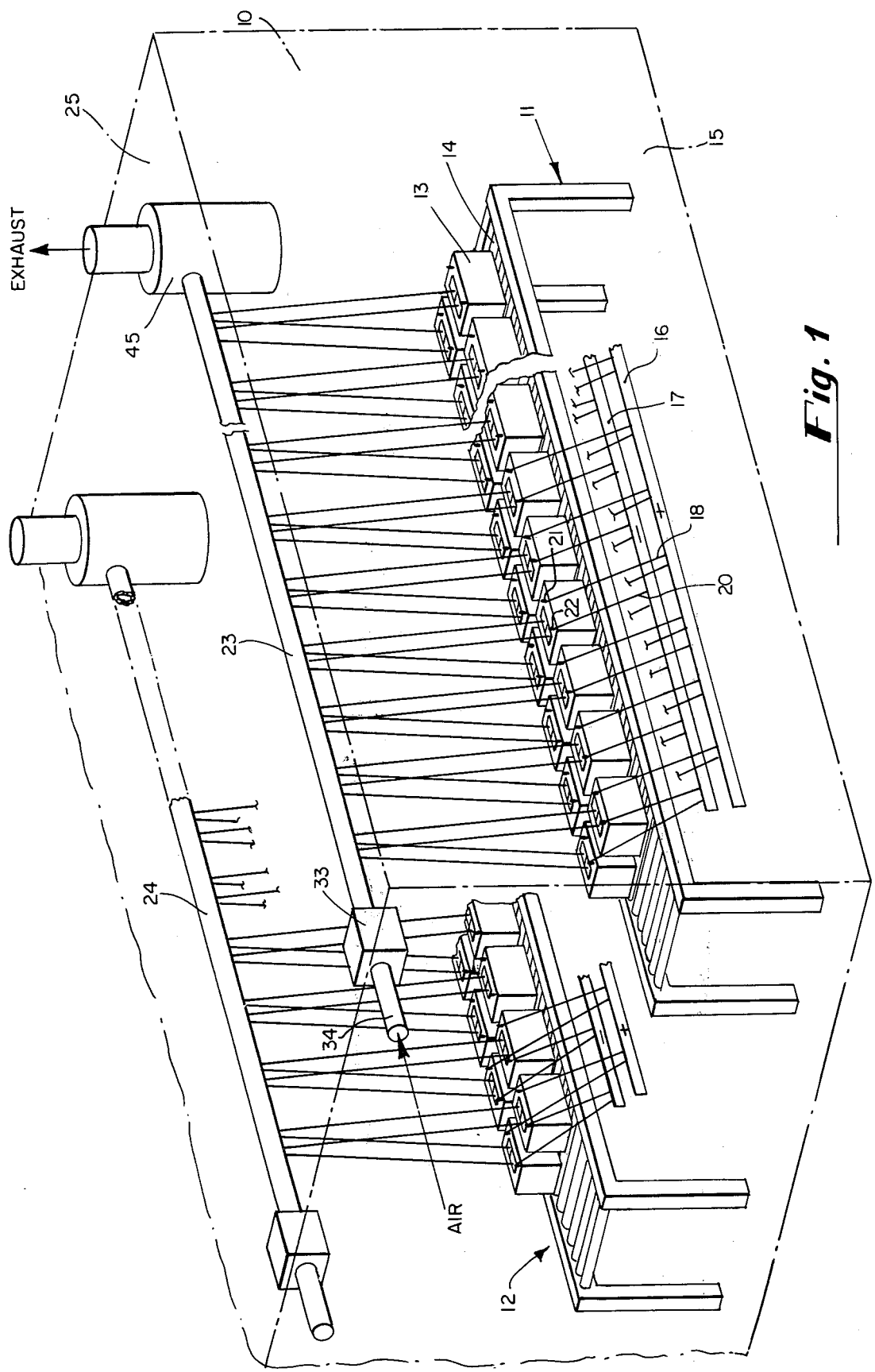
FIG. 1 is a top perspective view of a battery forming room (schematically illustrated), wherein two conveyor lines are illustrated, and with exhausting systems in accordance with this invention being provided for each line thereof.

Although specific forms of the invention have been selected for illustration in the drawings, and the following description is drawn in specific terms for the purpose of describing these forms of the invention, this description is not intended to limit the scope of the invention which is defined in the appended claims.

Referring now to the drawings in detail, reference is first made to FIG. 1, wherein a battery forming room is generally designated by the numeral 10, wherein two lines of battery formation, 11 and 12 are illustrated, with batteries such as that 13 being supported on a suitable roller conveyor or the like such as that 14, at some convenient distance above the floor 15 thereof. Suitable sources of electric potential 16, 17 are provided, having some means such as the leads 18, 20 adapted for clamp connection or the like to battery cell terminal posts 21, 22, respectively. Thus, means is provided for charging batteries having an electrolyte therein. It will be assumed for purposes of the illustration of FIG. 1, that the electrolyte, generally sulfuric acid in solution has already been applied or deposited into cells of the batteries, preferably in the forming room.

While the suitable sources of electric potential 16 and 17 are schematically illustrated as supplying each individual battery, it is to be understood that depending upon the preferred formation process, and particularly depending upon the rectifiers selected to supply direct current to the particular batteries to be formed, it may be desirable to electrically connect groups of batteries in series during the formation process. As illustrated particularly in FIG. 5, in a conventional storage battery there is relativey little room between the terminal posts and the fill holes of the batteries from which gas is generated and during the hooking and unhooking process, particularly with charged batteries, sparks are very likely to be generated either as a result of the connection of various electrical leads to the batteries or, alternatively, by reason of inadvertent shorting between adjacent terminal posts which might occur as a result of a screwdriver, wrench or similar conductive material inadvertently bridging between two battery terminal posts. As opposed to conventional operating facilities where batteries are normally disconnected from an electrical circuit after they have reached a discharged condition as a result of battery failure, in a forming room batteries are not only in a charged state, but also have generaly immediately finished the portion of the charging cycle wherein gasing is most evident. Therefore, unlike normal operating conditions for batteries, the disconnection of formed batteries occurs immediately after vigorous gas production and when the batteries are in a state of substantially full charge, thereby maximizing the likelihood that both gases and sparks will combine to produce an explosion.

Further, as illustrated in FIG. 1, a great number of batteries may be attached for forming at any given time. Since the formation process itself may last typically between 12 and 36 hours for a conventional automotive battery, and further since the associated electrical equipment required for charging is relatively expensive and may, in fact, be a critical limit on plant production capacity in certain installations, it is of utmost importance that the batteries introduced into the forming room be connectable and disconnectable from the associated electrical and pollution equipment extremely rapidly in order to prevent attendant delays which might adversely affect battery production.

A pair of ducts 23, 24 are generally horizontally disposed at a substantial elevation above the batteries 13, and preferably near the ceiling 25 thereof, such disposition being principally for the sake of convenience.

Figure 9:
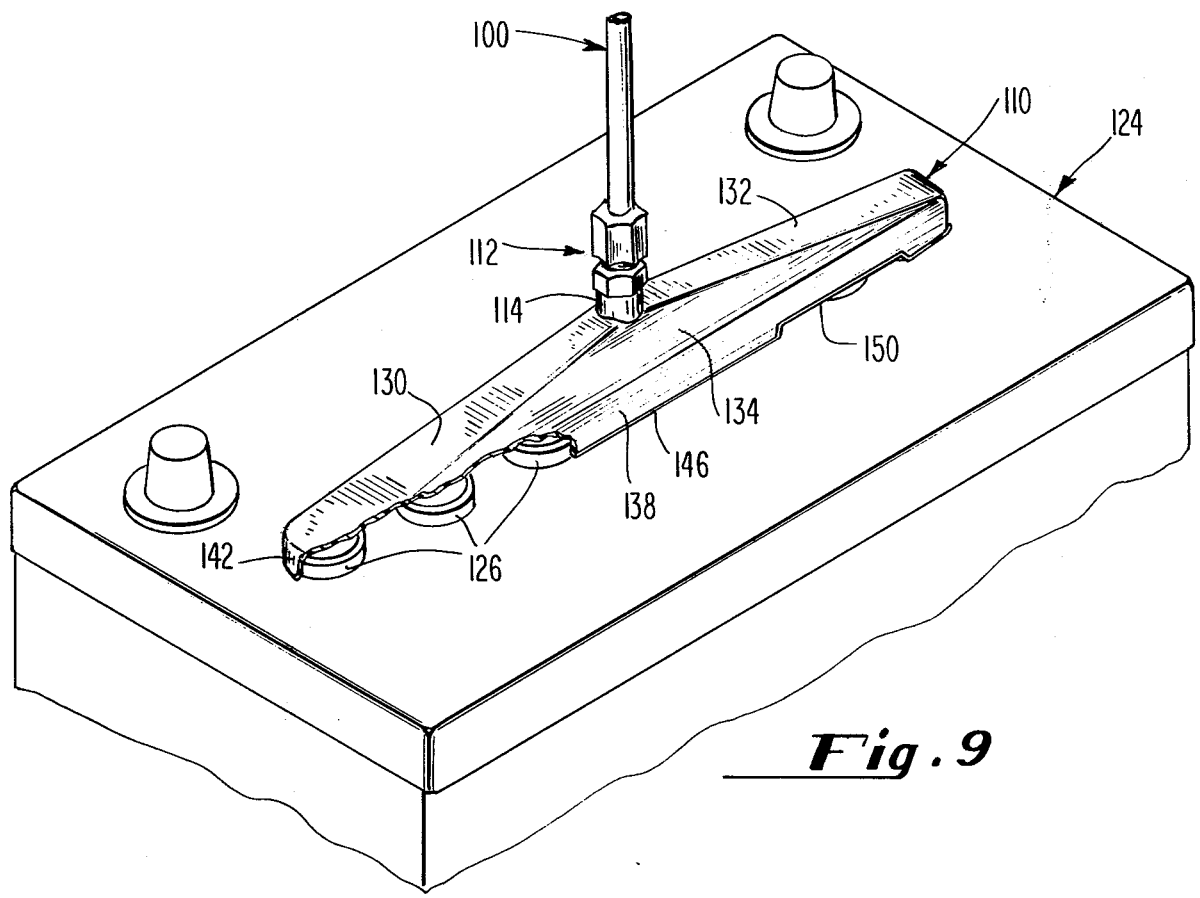
FIG. 9 is a top perspective view similar to the view taken in FIG. 5 wherein the nozzle of the preferred embodiment of the present invention is shown in engagement with and covering the fill holes of a relatively larger battery than that illustrated in FIG. 5.

Referring now in particular to FIGS. 5, 6 and 9, it will be seen that in the preferred embodiment of the present invention the conduits used to extend between the ducts 23 and 24 and the particular batteries to be serviced are elastomeric conduits which may be composed of polyvinyl chloride or other such materials which are substantially inert to the battery vapors to be drawn therethrough. As illustrated in FIG. 6, the conduit of the preferred embodiment may be screwed onto a threaded nipple or otherwise attached to the conduit 23 by means of hex nut 102. The upper portion of the conduit 104 is of a helical configuration which is intended to act as a mild spring to retain the nozzle designated generally 110 well above the batteries to be serviced when not in use. A relatively straight lower conduit portion 106 is provided which is attached to the nozzle by hex nut 108 and the remainder of the compression fitting designated generally 112 which is shown inserted in annular aperture 114 of the nozzle designated generally 110.

As seen in FIGS. 5-9, the nozzle designated generally 110 is suitable for engagement on any of the three standard sizes of automotive batteries. In FIG. 5, the nozzle designated generally 110 is shown in engagement on and covering the fill holes of the smallest standard sized automotive battery designated generally 120. A portion of the nozzle 110 is cut away to show that fill holes 122 of that battery are substantially enveloped by the lower portion of the nozzle, as will be described more fully hereinafter. By the same token, in FIG. 9 the largest standard automotive battery size is illustrated and this battery is designated generally 124 in FIG. 9, and similarly has its fill hole openings 126 substantially covered and enveloped by the lower portion of nozzle 110.

Figure 7:
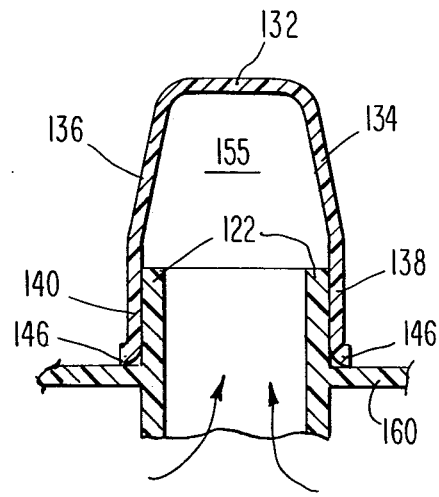
FIG. 7 is a greatly enlarged cross section of a portion of the nozzle shown in FIG. 5 taken as indicated by the lines and arrows 3—3 in FIG. 6 wherein the nozzle is shown in engagement with a fragmentary portion of the cover of the battery illustrated in FIGS. 5 and 6.
Figure 8:
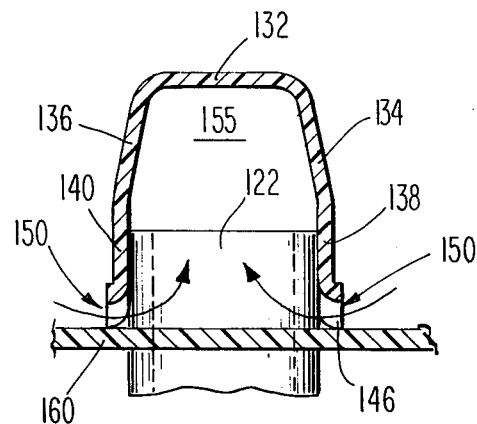
FIG. 8 is a greatly enlarged cross-section of a portion of the nozzle shown in FIG. 5, taken as illustrated by the lines and arrows 4—4 in FIG. 6 showing a portion of the covers and fill hole of the battery illustrated in FIGS. 5 and 6.

As seen in FIGS. 5-9, the nozzle is compression-molded from vinyl or other inert somewhat deformable material. As illustrated in FIGS. 7-9, the nozzle of the preferred embodiment is provided with an annular aperture 114 with top surfaces 130 and 132 sloping down and away from the conduit designated generally 100. Extending between the lateral edges of each of these top surfaces 130 and 132 are substantially triangular portions 134 and 136 which are seen to extend to connect to sidewalls 138 and 140. The top surfaces 130 and 132 are seen to be somewhat narrower than the outside diameter of fill holes 122 and triangular portions 134 and 136 extend slightly outwardly therefrom so that in the engaged position, sidewalls 138 and 140 will extend down on either side of the exterior of the fill holes as illustrated in FIGS. 7 and 8 to compressively engage those holes. Sidewalls 138 and 140 and end portions 142 and 144 terminate in a guiding edge 146 which is curved outwardly away from the fill hole and which serves to guide the nozzle over the fill holes when placed thereon. The lower peripheral edge of the nozzle is substantially coplanar except for portions thereof which form small longitudinal cutouts in the sidewalls 138 and 140 which cutouts 150 allow atmospheric gases to pass into the interior 155 of the nozzle as illustrated by the arrows in FIG. 8. Simultaneously therewith, battery vapors as illustrated by the arrows in FIG. 7 enter the interior of the nozzle 155 through fill hole openings 122 and mix with the atmospheric gases primarily within the void defined between triangular portions 134 and 136, that is, within the scope which is above the level of the top of the fill holes but enclosed within the nozzle designated generally 110. This mixing action is well illustrated in FIG. 6 wherein it is seen that when a smaller battery is used and the nozzle overlaps over the edges of the battery case, air is not only drawn in through side openings 150 but also through the ends of the nozzle whereupon the air or other atmospheric gas which is drawn in will mix within the head space defined by the top of the fill holes, the two triangular portions 134 and 136 and the top surfaces 130 and 132, as illustrated in FIG. 6.

In this preferred embodiment, the nozzle configuration is such that the distance between sidewalls 138 and 140 is slightly smaller than the outside diameter of fill holes 122 so that upon engagement of the top of the battery case over the fill holes, the guide portions of the lower peripheral edge 146 engaged the top corners of the fill holes and forced the side portions 138 and 140 slightly apart to create a tension on the outside of the fill holes which is sufficient to counteract the pull of the helical conduit on the nozzle and to allow the nozzle to thereby retain in engagement on the top of the battery as illustrated in FIGS. 5-9. It is therefore seen that the preferred embodiment nozzle may easily be placed on or removed from any of a plurality of standard size batteries merely by grabbing the nearest nozzle and by pushing it down over the fill holes of each battery to be serviced thereby.

Figure 3:
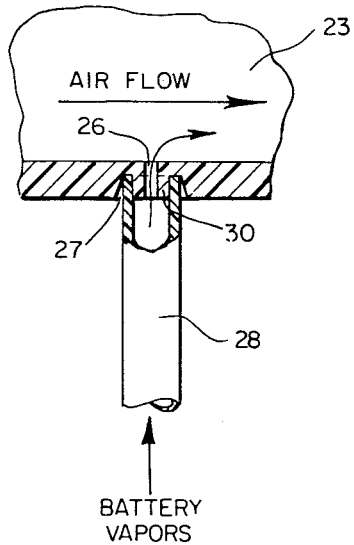
FIG. 3 is an enlarged fragmentary detail view, in vertical section, of the connection of a conduit to the overhead duct, in accordance with this invention.
Figure 2:
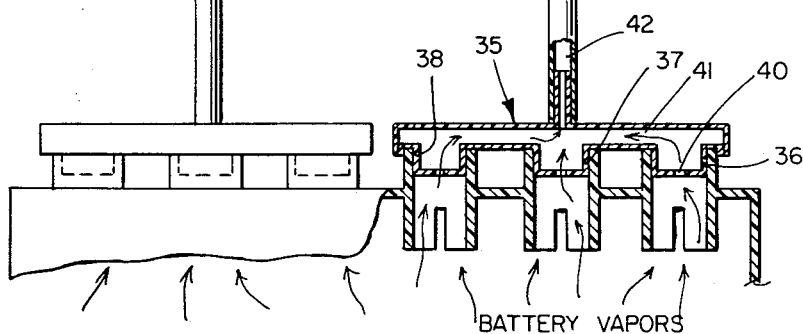
FIG. 2 is an enlarged fragmentary elevational view of a duct having conduits thereof being illustrated foreshortened, and with battery connection devices provided at lower ends of conduits, and with one such connection device and the related portion of a battery with which it is associated being illustrated in vertical section, for the sake of clarity.

With reference to FIGS. 2 and 3 in particular, it will be noted that at various locations along the ducts 23 and 24, small openings 26 are provided at the lower ends thereof that are provided with annular counter-grooves 27. Conduits 28 are connected about the holes or openings 26, by the upper ends of the conduits 28 being in stretch-gripping relation to the outer periphery of the member 30 defined by the groove 27, as by pushing the flexible conduits 28 thereover a sufficient amount that enough gripping will occur between the upper ends of the conduits 28 and the protrusions 30 to carry the conduits 28.

The duct 23 will preferably be of at least 4-inch diameter and will be disposed generally above the conveyor 14, preferably midway between the two rows of batteries disposed thereon. A similar disposition will be provided for the duct 24. Each of the ducts will preferably be of polyvinyl chloride pipe, and will be equipped with a changeable filter 33 at the left-most ends thereof as illustrated in FIG. 1, although the filter could be disposed anywhere as desired. Also, provision for intake of air from the general environment of the forming room may be made, as at 34, as desired for withdrawing any air or the like from the forming room, in conjunction with battery vapors. In the event that the nozzles of the preferred embodiment of the present invention are utilized, the intake of air from the general environment of the forming room will be in addition to the intake of air by the preferred embodiment nozzles which occurs directly in the vicinity of the nozzle. It will be noted that such may be desirable in order to provide a significant quantity of flow through the ducts 23 and 24, in order to carry off corrosive trace components thereof prior to condensation.

The conduits 28 may also be of polyvinyl chloride construction, or any type of rubber or synthetic rubber that, like the ducts 23 and 24 are substantially inert to components of the vapors drawn therethrough.

At the lower ends of the conduits 28, for example as illustrated in FIG. 2, there are provided alternative battery cell sealing members 35 initially free and open to the forming room at their lower ends. These members 35 preferably have facility 36, 37, 38 for connection to a plurality (preferably three) of battery cell vent openings, as illustrated, selectably connectable and readily disconnectable to openings of battery cells upon disengagement of the members 35 from the batteries, for sealing such openings against dispersion of battery vapors to the atmosphere within the forming room, but for providing openings such as that 40, for receiving battery vapors therein, through a manifold 41, and into the interior 42 of the conduit 28.

The member 35 will also preferably be of a plastic, rubber or like construction such as polyvinyl chloride, that renders it inert to components of the vapors drawn therethrough.

Some means will preferably be provided to create a partial vacuum that will facilitate the withdrawal of the vapors as aforesaid, through the battery cell openings, into the member 35, and up through the conduits 28 to the ducts such as 23. While such means could be provided by the presence of a fan or the like at the left-most end of the duct 23 illustrated in FIG. 1, if desired, whereby a venturi action would create an eduction of the vapors up through the upper ends of the conduits 28 as illustrated in FIG. 3, it will be preferable to utilize a partial vacuum rather than a positive air pressure flow, also in the ducts 23 and 24. Such will generally be provided by a fan or the like, and may if desired also employ an arrangement for neutralizing components of the vapors such as that illustrated in FIG. 4, as well as for reducing or substantially eliminating the hydrogen components of the vapors. It will be noted that one such arrangement is provided for each of the ducts 23 and 24 illustrated in FIG. 1, but that a single such exhaust system 45 could be utilized, to which all of the ducts 23, 24 would be connected, if desired.

Figure 4:
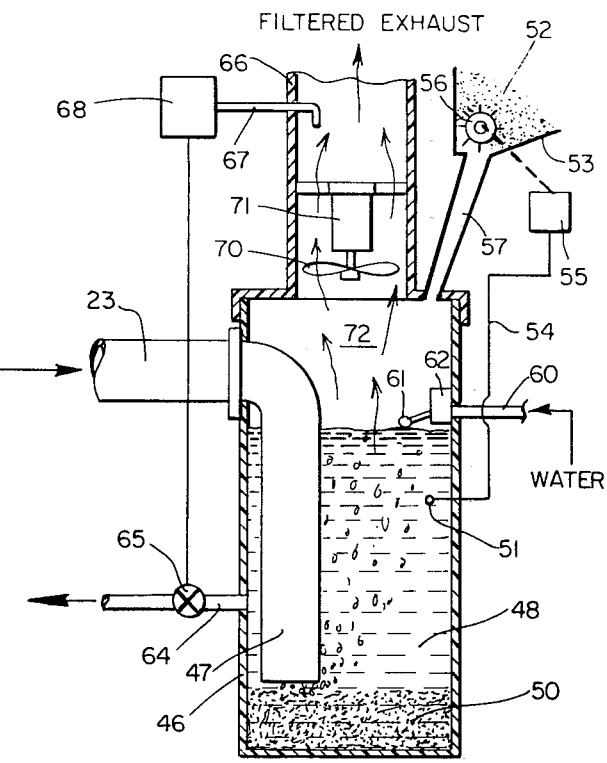
FIG. 4 is a generally vertical sectional view, substantially schematically illustrated, of the vapor cleaning, purification, or neutralizing component of the system of this invention, as well as with the exhaust for supplying a partial vacuum for withdrawing the vapors through the conduits and duct.

In the arrangement illustrated in FIG. 4, a chamber 46 is provided, to which the duct 23 is connected, having a battery vapor inlet, and a portion 47 extending downwardly into a liquid, preferably water bath 48.

Assuming that the electrolyte components of the vapors are acids, such as sulfuric acid traces, an alkaline substance, such as soda ash or the like 50 may be disposed in the chamber 46, for neutralizing the acid delivered into the liquid 48 from the conduit portion 47. If constant control over the pH or over the acid-alkaline content of the liquid 48 is desired, a sensing device such as 51 may be utilized, to sense the pH or acidic content of the liquid 48 within the chamber 46, and, depending upon the content, to deliver or not to deliver a given amount of soda ash or other alkaline from a hopper 53 thereof. Such a system could utilize the drawing-off of some of the liquid by the element 51, through the line 54, and into a pH testing device of a conventional purchased type, such as indicated by the member 55, that would be operative to actuate a motor or the like to initiate the rotation of a rotatable paddle wheel 56, if desired, upon sensing the need for more soda ash or other alkaline in the liquid 48 for bringing the liquid 48 to a desired pH. Thus, upon rotation of the wheel 56, some soda ash 52 could be delivered from the hopper 53, through the line 57, into the chamber 46 as illustrated. It will be noted that the testing device 55 may be operative in any conventional manner, such as by sensing the electrical conductivity characteristics of a sample of liquid drawn off through the element 51 in line 54, or in any other suitable manner.

It will be noted that a water inlet 60 is provided to the chamber 46, along with a suitable float 61 that is connected for operating a switch-valve combination 62, for allowing inlet of water through the line 60, in order to maintain the water level within the chamber 46 as desired.

Also, it will be recognized that inasmuch as hydrogen is one of the gases normally given off during battery charging, substantial quantities of hydrogen may be delivered to the water 48, such as may saturate the same. Accordingly, it may be necessary to periodically draw off some of the liquid 48, as for example, through the line 64, by actuating a valve 65, and such drawing-off may either be manually done, or if desired, may also automatically reflect a continuous quantitative analysis of the amount of hydrogen being exhausted to atmosphere through the stack 66, by the use of a probe 67 or the like that draws off a sample of the gas being exhausted through the stack 66 into a suitable testing device 68. The device 68 may thus automatically monitor the amount of hydrogen being discharged, and consequently may monitor the saturation potential or absorption capabilities of the liquid 48 for hydrogen being delivered through the line 47, and, if need be, upon deviation of such amount of hydrogen from some preset limit, may automatically actuate the valve 65 for drawing off some of the liquid 48 as is schematically illustrated.

With a closed system such as that illustrated in FIG. 4, the use of a fan 70, such as motor driven by the motor 71, will create a suction in the upper end 72 of the chamber 46 above the liquid level, that will draw the vapor through the line 23 as aforesaid. It will be apparent from the foregoing, that it will be possible to discharge through the stack 66, vapors that have been cleaned, purified, or otherwise rendered inert, or in a neutralized state, or substantially so. Thus, substantially all of the acid will be withdrawn from the vapors, and most if not all of the excess and free hydrogen can be absorbed in the liquid 48, such that the gas that is exhausted to atmosphere may be quite clean and the residue that forms in the chamber 46 may be relatively harmless.

It will be noted that, depending upon the amount of air that is evacuated from the forming room as for example, as indicated at the left-most ends of the ducts 23 and 24 illustrated in FIG. 1, the vapor may either be subjected to a partial vacuum directly the result of the draft created by the fan 70, or in the alternative, if a greater flow through the ducts 23 and 24 is maintained such that substantial quantities of air are withdrawn from the environment of the forming room itself, the flow of air through for example the duct 23, may in itself create a venturi effect that will withdraw the vapors into and through the conduits 28. In any event, the flow of the vapors through the conduit 28 will be caused by a partial vacuum, the origin of which may vary as discussed herein, or as is otherwise within the purview of one of ordinary skill in this art.

It will be noted that various components that would come into contact with acid traces and the like will be constructed to be inert thereto. For example, the chamber 46 may be of fiberglass, or various plastic constructions that will not react with acid traces. Also, the amount of liquid level in the chamber 46 may be as much as 18 inches or more, if desired, and the level control therefor could be provided by any suitable ball cock and level arrangement.

While the above description has referred primarily to placing the gas collection means of the present invention over or in engagement with the fill holes of a given battery to be serviced, it should be understood that as used herein, the term "fill holes" is intended to relate to any portion of the battery which is designed to vent gases therefrom during the forming process. Therefore, for example, in maintenance-free batteries, the gas collection means would be appropriately configured to cover and be retained around the vent means of those batteries, even though conventional fill holes are not formed in those batteries.

Additionally, while the above description has described gas collection means for at least collecting battery vapors generated during the forming process, which are preferably generally biased away from the batteries to be serviced and are quickly removably attached to and retained by each battery to be serviced, it should be understood that it is within the scope of the present invention to provide alternate means for retaining the gas collection means to the battery, provided that that alternate means meets the requirements of rapid manual attachment and removal so that within a matter of a very few seconds, each individual gas collection means may be adhered to each battery to be serviced, or alternatively, removed from each battery to be serviced with a simple hand motion of the forming room operator so that a maximum number of batteries may be processed within a forming room of given capacity. Also, as used in the specification and claims of this invention, the term "forming room head space" refers to the upper portion of the battery forming room disposed substantially above the batteries formed, as more fully described in connection with the various prior art disadvantages of previous battery forming methods.

It will be understood that various changes in the details, materials and arrangement of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent and Trademark Office, and is not intended to limit the scope of the invention described and claimed herein.

What is claimed is:

1. A lead-acid storage battery forming room comprising:
   a. a conveying surface for receiving batteries to be formed;
   b. charging means for applying direct electric current to said batteries; and
   c. a plurality of gas collection means, at least one for each battery to be formed, for collecting battery vapors generated during charging, each of said gas collection means further comprising nozzle means for covering at least a portion of the fill holes of said batteries and resilient, conduit means for withdrawing said collected gases from said nozzle means, said conduit means biasing said nozzle means away from said conveying surface.

2. The invention of claim 1 wherein each of said nozzle means further comprises means for removably adhering to said respective ones of said batteries.

3. The invention of claim 1 wherein said nozzle means further comprises means for collecting atmospheric gases from the vicinity adjacent the spaces between said fill holes.

4. The invention of claim 3 wherein said nozzle means further comprises chamber means for mixing said atmospheric gases with said battery vapors prior to allowing said vapors to pass to said conduit means.

5. The invention of claim 3 wherein said gas collection means further comprises means for collecting gases from the headspace of said forming room.

6. The invention of claim 2 wherein said means for removably adhering to said battery comprises means for compressively engaging the sides of said fill holes.

7. The invention of claim 3 wherein said means for collecting said atmospheric gases are disposed at least generally adjacent and between the fill holes of said respective ones of said batteries.

8. The invention of claim 1 wherein each of said nozzle means is adapted to removably adhere to and cover the fill holes of any of a plurality of preselected sizes of batteries having a plurality of different sized cases and co-linear fill hole spacings.

9. The invention of claim 1 wherein at least a portion of said conduit is helically configured to thereby bias said nozzle means away from said conveying surface.

* * * * *